United States Patent [19]

Matchett

[11] 4,032,457

[45] June 28, 1977

[54] PLURAL STAGE FILTER CARTRIDGE WHEREIN AT LEAST ONE STAGE COMPRISES PULVERIZED PARTICULATE MATERIAL

[75] Inventor: Robert W. Matchett, Suffield, Conn.

[73] Assignee: Fibredyne, Inc., Suffield, Conn.

[22] Filed: June 4, 1975

[21] Appl. No.: 583,749

[52] U.S. Cl. .................................. 210/489; 55/316; 55/487; 210/492; 210/497 R; 210/501; 210/502; 210/505; 210/509
[51] Int. Cl.² .................. B01D 25/04; B01D 25/16
[58] Field of Search .......... 210/282, 502, 314, 503, 210/315, 437, 446, 490, 491, 492, 457, 483, 504, 505, 501, 506, 508, 509; 55/316, 487, 489

[56] References Cited

UNITED STATES PATENTS

| | | | |
|---|---|---|---|
| 327,646 | 10/1885 | Bingham | 210/446 |
| 2,539,768 | 1/1951 | Anderson | 210/457 |
| 2,802,405 | 8/1957 | Krogel | 210/457 |
| 3,158,571 | 11/1964 | Supinger | 210/314 |
| 3,209,916 | 10/1965 | May et al. | 210/315 |
| 3,261,473 | 7/1966 | Riede | 210/315 |
| 3,384,241 | 5/1968 | Nostrand | 210/315 |
| 3,434,599 | 3/1969 | Wischmeyer et al. | 210/315 |

Primary Examiner—Frank W. Lutter
Assistant Examiner—Frank Sever

[57] ABSTRACT

A multiple phase filter cartridge is presented wherein the filter has two or more distinctly different fibrous layers with at least one of the fibrous layers containing active particles. The different layers are formed in place on the filter by a wet accretion process.

18 Claims, 4 Drawing Figures

FIG. 1
FIG. 2
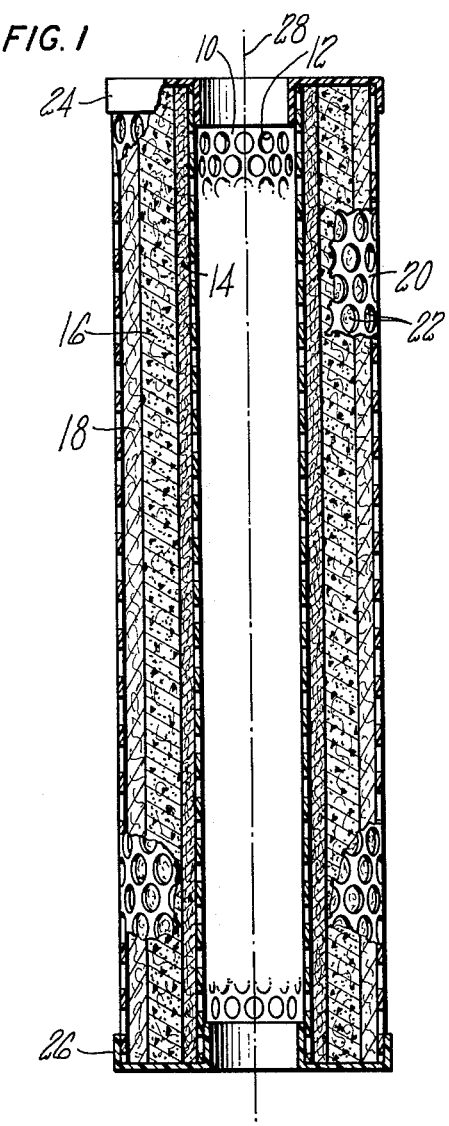
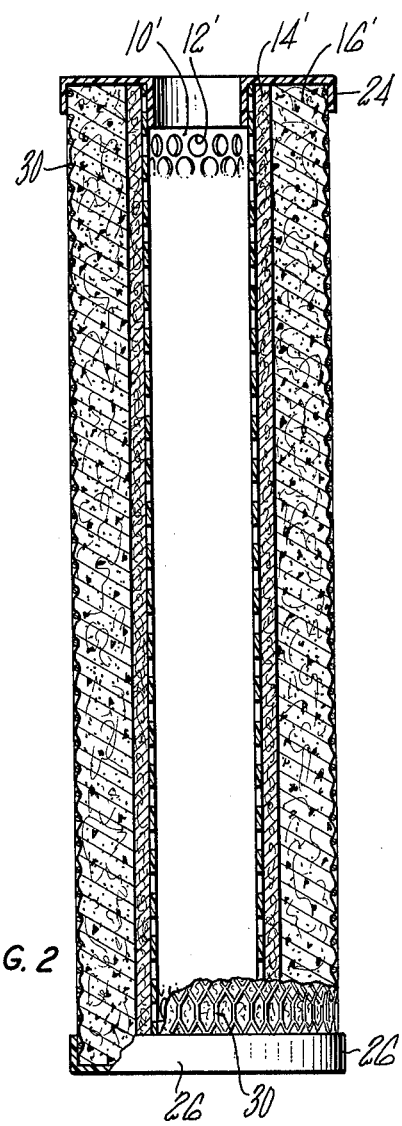

U.S. Patent   June 28, 1977   Sheet 2 of 2   4,032,457
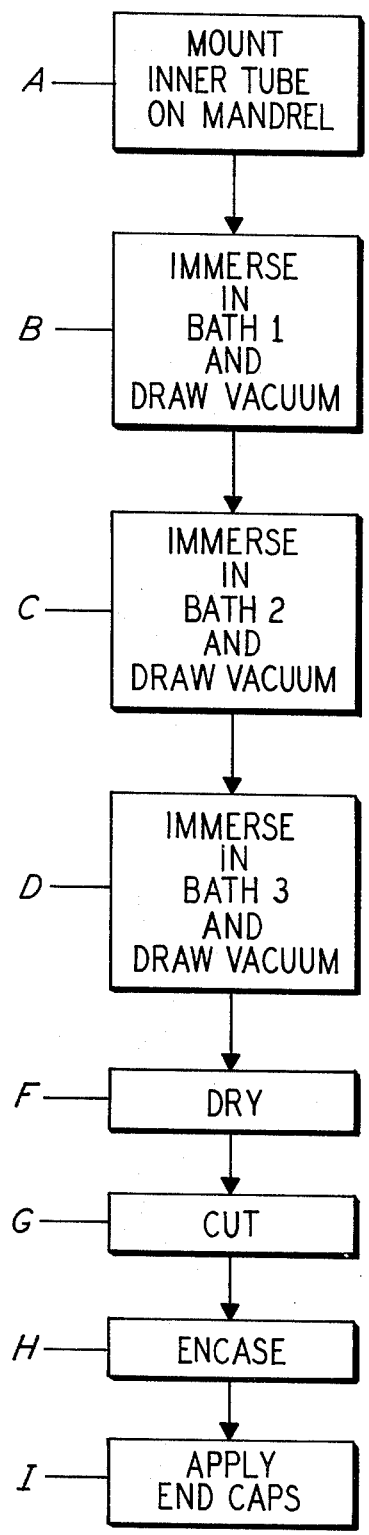
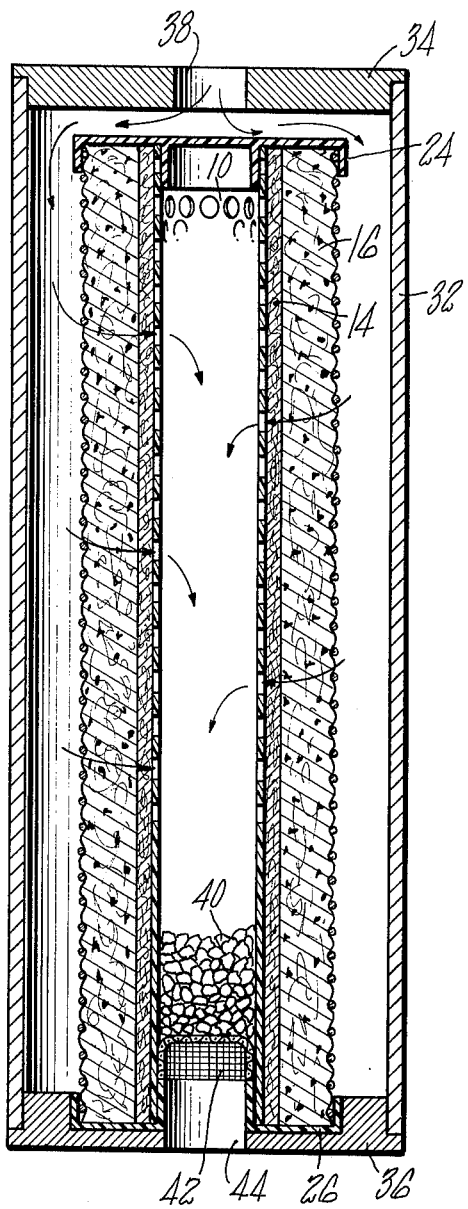

PLURAL STAGE FILTER CARTRIDGE WHEREIN AT LEAST ONE STAGE COMPRISES PULVERIZED PARTICULATE MATERIAL

BACKGROUND OF THE INVENTION

This invention relates to the field of multiple phase filter cartridges. More particularly, this invention relates to the field of multiple phase filters of the cartridge type having two or more distinct filtering layers, at least one of which contains an active filtering material, the active filtering material preferably being in a pulverized form.

The advantages of the use of active particles for use in filtration and treatment, chemical or otherwise, has long been recognized in the filter art. In particular, the theoretical advantages of the use of such active materials in extremely fine or pulverized form, i.e., 40 mesh size or smaller, has also long been recognized but has found little practical application. A particular problem has been recognized in that when a bed of active powder of less than 40 mesh size is used alone, the fluid dynamics of the material flowing through the filter cause the fine powder to "channel," i.e. passages are formed through the bed of fine active powder. The formation of these passages serves, in effect, to allow the fluid to become untreated as it passes through the channels without contact with the active powder. It has been proposed to add resinous binders with the pulverized active material to form a structure of suitable physical integrity whereby the channeling will be avoided. However, the amount of resinous binder required to achieve the desired physical integrity is usually sufficient to partially seal off the pores of the active powder, thus seriously affecting performance of the filter.

Other efforts to employ active materials have involved grannular materials of greater than 40 mesh size bonded together with various resinous materials to form desired shapes, but such filters have the decided disadvantage of low permeability and little filtration in depth. Similarly, other specifically shaped products are available which are composed of coarse granules or pelletized particles of active material bonded together with various resinous materials. Although these further products offer some permeability to fluid flow, they serve as screens, in effect, for particle removal from the fluid flow, and seal off rapidly during the filtration cycle. In addition, because of the greater than 40 mesh screen size of the granules or pellets, the full effect of the surface area that would otherwise be available with pulverized, fine active powder is lost.

Filter cartridges are, of course, in general use which incorporate various combinations of pleated and non-pleated filtration media, i.e. paper, cloth, felt, etc. along with granular active materials such as activated carbon and ion exchange resins. In almost every case, some type of fine porous medium is employed downstream from the granular material to retain the granular active material as well as the fine active particles which break loose by fluid dynamic attrition. Such "fines" would be a source of contamination to the resulting filtrate. Although such filters can be designed to provide for a combination of physical filtration and chemical treatment, none are known which effectively take advantage of the considerably greater surface area of pulverized rather than granular or pelletized active material such as activated carbon, molecular sieves, and ion exchange resins.

SUMMARY OF THE INVENTION

The above discussed and other problems of the prior art are eliminated or reduced by the filter of the present invention which has a porous fibrous structure of 2 or more distinctly different layers, with at least one of the layers consisting of a homogeneous mixture of pulverized active particles, fibers and suitable bonding agents. The term "active particles" will be understood to mean discrete pulverized particles which are regarded as showing activity for such phenomena as adsorption, absorption, ion exchange, dehydration and catalysis.

In the present invention the layer containing the pulverized active particles provides both filtration and chemical treatment to the fluid passing through, while any layer which does not contain the active particles serves to provide additional filtration. By selection of fibers to be incorporated in the layer containing the active particles, this selection being based primarily on the diameter of the fibers, a predesigned filter medium can be manufactured with reproducible particulate retention capabilities. The other layers, which may be on one or both sides of the fibrous-active particle layer, are also designed by selection of suitable fiber diameters and binders to serve as needed having reproducible particulate retention capabilities, each with its own characteristic filtration properties. Thus, two or more porous fibrous layers of differing compositions, one of which provides a combination filtration-chemical treatment to the fluid to be treated, can be formed in layers of various thicknesses to provide a particularly effective filter-chemical treatment device which operates by passing the fluid to be treated in a path essentially normal to the various layers.

A particularly important feature of the present invention is found in the method of formation of the filter, particularly in cartridge form. Cartridge type filter elements are formed by wet accretion on a perforated cylindrical mandrel in which a vacuum is drawn. The mandrel is dipped or otherwise immersed in a homogeneous bath or slurry of the material to be accreted, and a vacuum is pulled in the mandrel, thereby resulting in the formation of an annular layer of homogeneous material on the mandrel (or on a suitable filter core on the mandrel). By dipping or immersing the mandrel in successive baths or slurries of different compositions, the several layers of the filter are formed in consecutive annular rings. Suitable inner cores and outer covers can be provided along with end caps where appropriate.

Accordingly, one feature of the present invention is to provide a novel and improved multilayer filter element.

Another object of the present invention is to provide a novel and improved multilayer filter element in which at least one of the layers consists of an homogeneous mixture of pulverized active particles, fibers and suitable bonding agents.

Still another object of the present invention is to provide a novel and improved multilayer filter element in which the several layers of the filter element are formed in essentially homogeneous layers through a wet accretion process.

Other objects and advantages will be apparent to and understood by those skilled in the art from the following detailed description and drawings.

BRIEF DESCRIPTION OF THE DRAWINGS

Referring now to the drawings, wherein like elements are numbered alike in the several figures:

FIG. 1 is an elevation view, partly in section and partly broken away, showing a three phase filter in accordance with the present invention.

FIG. 2 is a view similar to FIG. 1 showing a two phase filter in accordance with the present invention.

FIG. 3 is a flow diagram depicting the method of formation of multiphase filters in accordance with the present invention.

FIG. 4 is a view showing an in-line filter in accordance with the present invention.

DESCRIPTION OF THE PREFERRED EMBODIMENT

Referring first to FIG. 1, the filter an inner annular core 10 in the form of a perforated tube. Tube 10, which may typically be of a suitable plastic material such as polyproplyene, is perforated with holes 12, the size of which may vary depending on the physical characteristics of the fibers to be accreted onto the tube. Tube 10 functions to provide compressive strength to the entire filter element, and it defines the central flow passage through which the filtered material is discharged after having passed through the filtering phases. Tube 10 is normally required for most liquid filtering applications, but it may be omitted in those cases where the entire filter element is post-saturated with a rigidizing material such as a resinous product or an aqueous silicate solution. Tube 10 may be, and frequently is, the same core element upon which the fibrous layers of the filter are formed in series in the accretion steps of the manufacturing process.

Immediately adjacent and accreted to tube 10 is an annular fibrous ring 14 which serves as the final filtering phase of the filter. Immediately adjacent and accreted to the exterior of fibrous ring 14 is an annular fibrous ring 16 which serves as an intermediate filtering stage and contains active pulverized powder or other material for chemical treatment. Immediately adjacent and accreted to the exterior surface of annular fibrous ring 16 is an annular fibrous ring 18 which serves as the first filtering phase. An exterior perforated tube 20 with multiple flow passages or holes 22 and a pair of end caps 24 and 26 complete the physical structure of the filter. Exterior tube 20 is typically a perforated tube of extruded polypropylene, although fabrics of natural and synthetic fibers may also be empolyed. Exterior tube 20 serves to provide both improved handling and abrasion resistance and also to provide an aesthetically pleasing appearance. The end caps 24 and 26 are adhered to the fibrous structure of rings 14, 16 and 18, and may also be bonded to tubes 10 and 20. These end caps may be molded in situ by use of common plastisol techniques, or can be otherwise formed out of a variety of materials such as thermosetting and thermoplastic resins and metals. At least one of the end caps will have an opening coaxial with the axis 28 of the central passage of tube 10 for discharge of the fluid after passing through the filter.

The specifics of the fibrous rings 14, 16 and 18 will now be discussed. In that discussion, reference will be made to "small diameter fibers" which shall be understood to mean herein sizes in the range of 1 to 25 microns for synthetic fibers, and 0.1 to 5 microns for inorganic fibers. Similarly, references to larger diameter fibers will be understood to mean in the range of 25 to 100 microns for synthetic fibers, and 5 to 13 microns for inorganic fibers. Cellulose fibers ranging from 10 to 40 microns are used as a binder assist in blends of small and large diameter fibers.

The fluid to be filtered passes through the holes or openings 22 in exterior tube 20 and flows generally transversely of the filtering stages, i.e. in a direction generally perpendicular to axis 28. The fluid flowing through holes 22 is delivered first to fibrous ring 18 which serves as a first filtering stage. This first filtering phase is more permeable than the succeeding filtering phases in the filter, and hence it is composed of fibers generally having a larger average diameter than the fibers in the succeeding filtering stages. The primary filtering function of ring 18 is to provide filtration in depth to remove the larger contaminating particles (e.g. generally on the order of 20 microns and larger for most potable water applications which may be present in the incoming fluid stream. It is particularly desirable that the fibers of the first filtering stage be selected to achieve a relative low specific gravity to assure that the well known "filtration in depth" phenomenon is utilized. The filter of the present invention is particularly suitable for filtering electroplating solutions or as a filter for potable water. For use with electroplating solutions, the first filtering phase of ring 18 would be preferably composed of a fiber blend of cellulose fibers, vinyl chloride-vinyl acetate copolymer fibers and microglass fibers with a binder of latex and other substantive wet strength resins. In weight percentages, the cellulose fibers will range from 0 to 50 percent of the blend, the vinyl chloride-vinyl acetate copolymer fibers will range from 20 to 75 percent of the blend, and the miroglass fibers will range from 10 to 30 percent of the blend. A particularly effective blend has been found to be approximately 12 ½% cellulose fibers, approximately 75 % vinyl chloride-vinyl acetate copolymer fibers and approximately 12 ½% microglass fibers. If water is being filtered, the cellulose fibers are frequently omitted because of the possibility of putrefaction in bacterial laden water, and the fiber blend is then composed of from 70 to 90 percent of the thermoplastic fibers (such as vinyl chloride-vinyl acetate copolymer fibers) and from 10 to 30 percent microglass fibers. A particularly effective blend for filter phase 18 for water filtration is 80% vinyl chloride-vinyl acetate copolymer fibers and 20% microglass fibers, with a suitable binder such as a latex or melamine formaldehyde resin.

For general use in filtering electroplating solutions, it has been found that the use of cellulose fibers, in amounts up to 50 percent, is highly desirable in the interest of providing structural strength, particularly when combined with the vinyl chloride-vinyl acetate copolymer fibers; and the cellulose increases resistance of the fiber blend to attack from mildly acidic and mildly alkaline materials; and the cellulose also serves to reduce the amount of microglass fibers required in certain situations where high percentages of microglass fibers cannot be tolerated.

Particularly for those filtering applications where significant quantities of gelationous precipitates are present, such as some of the metal oxides and hydroxides in particular, it may be desirable to reduce the permeability of this first phase, which may be accomplished by the use of smaller diameter fibers and/or fibers having less bulking characteristics. This lower permeability will cause the gelatinous materials to be retained in this first filtering phase, and thus minimize a surface sealing effect on the active particles of the second phase. In addition, for some applications which require only a combination of chemical treatment and a "polishing" filtering action, this first phase may not be required from a performance standpoint. However, where the active material in the second stage is carbon or some other material which may not present an attractive appearance, a relatively thin layer 18 will also serve a cosmetic purpose and render the finished product more aesthetically attractive.

Annular fibrous ring 16 constitutes the second filtering phase in the filter, this second phase being intermediate in permeability between the higher permeability first phase discussed above and the lower permeability third phase to be discussed below. This second phase of the filter contains the active pulverized powder material for chemical treatment. The intermediate permeability is achieved by selection of fiber diameters to be generally intermediate of the fiber diameters in the first and third phases and also because of the presence of the active powder material. The fiber blends and binders in this second stage are composed of the same materials discussed above with respect to the first phase of ring 18, and the general range of weight percentages is the same as set forth for ring 18. The powder and intermediate diameter size of the fibers reduces the permeability of this second stage. A particularly effective fiber blend for the second stage for filtering electroplating solutions has been found to be composed of approximately 12 ½% cellulose fibers, approximately 75 % vinyl chloride-vinyl acetate copolymer fibers, and approximately 12 ½% microglass fibers, with a suitable binder. A particularly effective fiber blend for water filtration has been found to be approximately 75 % vinyl chloride-vinyl acetate copolymer fibers and 25 % microglass fibers. The active pulverized powder material, which will be pulverized charcoal for many applications, is uniformly disbursed in discrete particles throughout the fiber matrix and is bonded to the matrix by point-to-point contact by a latex of melamine formaldehyde resin binder. It is important to note that the weight percent of a resinous binder must be held to 10% or less of the weight of the fibers in this active phase. Amounts in excess of 10% of such binder by weight will cause a detrimental reduction in the performance of the active powder.

Annular ring 14 constitutes the third phase of the filter, and it is accreted directly to inner tube 10. This phase is the final filtering phase, and it will generally have the lowest permeability of the phases of the filter. This third phase is formed with a high percentage (approximately 60%) of smaller diameter fibers of the same fiber blend and binder system as described above with respect to the second phase of ring 16. The lower permeability characteristic is achieved through the selection of fiber size. This third phase of the filter provides added assurances that any "fines" that may migrate from the preceding stages due to the kinetics of fluid flow will be trapped in this third phase, thus preventing introduction of foreign particles and possible contamination of the filtrate. This third phase is particularly important for the filtering of electroplating solutions. The introduction of conductive particles such as activated carbon in particular, would be particularly detrimental to the filtrate, and thus the final filtering of this third phase is important. For potable water filtration-carbon treatment, this third phase could be eliminated in those applications where a high degree of turbidity removel is not required and where the occasional introduction of minute carbon particles is not considered physiologically detrimental.

By way of example of the effectiveness of the filter of the present invention, a three phase filter was constructed as shown in FIG. 1 having a 2 ⅝inch outside diameter and a length of 10 inches. Water containing five parts per million free chlorine was fed through the filter at the rate of four gallons per minute. The output from the filter contained less than 0.1 parts per million of free chlorine. The pressure drop across the filter was 5 psi. Typically prior art carbon filter units have a flow rate of only from 1.5 to 3 gallons per minute at a 5 psi pressure drop. The significantly increased surface area of powdered carbon available for chemical treatment produced a significantly improved free chlorine conversion rate than was available with prior art devices for similar discharge flow. the unit showed improved characteristics with regard to sealing off, and no channeling of the powdered material was observed.

Referring now to FIG. 2, a modified version of the multiphase filter of the present invention is shown, with parts in the FIG. 2 embodiment corresponding to parts in the FIG. 1 embodiment being marked with a prime superscript. In the FIG. 2 embodiment the filtering stage 14' is present, corresponding to and a made of the same materials as the filtering phase 14 of FIG. 1. Similarly, an active particle filtering phase 16' corresponding to and composed of the same materials as phase 16 of FIG. 1 is also included. However, as distinguished from the FIG. 1 embodiment, the initial filtering phase 18 is omitted in the FIG. 2 embodiment, but the active filtering phase 16' is enlarged in width to be equal to the width or thickness of the combined stages 16 and 18 of FIG. 1. Thus, although the initial filtering phase is omitted, its omission is more than compensated for by the enlarged size of the active material filtering phase. Also, in the FIG. 2 embodiment the filtering phase 16' is ground concentric with the tube 10' to establish an accurate outer surface. A plastic netting 30 is secured around the exterior of filtering phase 16' to provide a lower cost protective covering for handling and abrasion.

Referring now to FIG. 3, a flow diagram of the process of forming the filter of FIG. 1 is depicted. The manufacturing process employs a cylindrical mandrel which is perforated, the mandrel being several feet in length. In the preferred manufacturing process, the length of the inner tubing 10 is mounted on the mandrel in step A of the process, the mandrel being sized to receive the length of tube 10. In the next step of the process, depicted as step B, the mandrel is immersed in a first bath or slurry containing a homogeneous mixture of the fibers of which annular ring 14 is to be constituted. A vacuum is then drawn in the hollow interior of the mandrel, whereby the negative pressure which is reflected through the mandrel perforations and the perforations in tube 10 causes an accretion of the wet fibers onto tube 10. The length and duration of the vacuum drawing are regulated in accordance with the thickness of layer 14 desired to be built up on tube 10. The mandrel is then withdrawn from bath 1, and, as depicted in step C, is immersed in bath or slurry 2 which contains a homogeneous mixture of the fibers of which filtering phase 16 is to be formed. Once again, a vacuum or negative pressure is drawn in the hollow interior of the mandrel whereby fibers from bath 2 are accreted onto the exterior of the fiber layer formed in step B. The degree and length of the vacuum or negative pressure is, once again, determined by the build up of layer 16 which is desired. Upon completion of step C, the mandrel is withdrawn from bath 2 and immersed in bath of slurry 3 which contains a homogeneous mixture of the fibers which form the exterior filter phase 18 in step D. As with steps B and C, the degree and length of vacuum or negative pressure drawn on the mandrel in step D is determined by the thickness of the filter phase layer to be deposited. The elongated unit with the three filter phases thus accreted in steps B, C and D is then dried in step F (which is preferably, but not necessarily, under vacuum conditions) and then cut to desired lengths of the final filter elements. After cutting to length, the multiphase element is then encased within pre-cut lengths of outer tubing 20 or outer netting 30 is step H, and the end caps 24 and 26 are then applied to complete the assembly.

From the foregoing description, it will be seen that by selection of fibers and fiber size, a predesigned filter medium can be achieved with reproducible retention of active particulate matter. Additional filtering phases are accreted onto either or both sides of the fibrous active particulate layer, and these other layers are again designed by selection of fiber diameters and binders to serve as reproducible particulate filter media, each with its own characteristic filtration properties. Thus, two or more porous fibrous layers of different compositions, one of which provides a combination filtration-chemical treatment to the fluid to be treated, can be accreted in layers of varying thicknesses to provide a novel and particularly effective filter-chemical treatment device when the fluid to be treated is allowed to pass in a path essentially normal to the various layers. As will be apparent, the various fibers and active powder materials which can be incorporated within the scope of the present invention can be custom selected in accordance with particular requirements of fluid filtration and chemical treatment.

A particularly effective application for the multiple phase filters of the present invention is as an inline filter such as depicted in FIG. 4. As shown in FIG. 4, the filter of FIG. 2 is located within a casing 32 which has removable end caps 34 and 36. Water or other fluid to be filtered is delivered to the interior of tube 32 through an entrance orifice 38 in cap 34, and the fluid flows, as depicted by the arrows, across the end cap 24 of the filter around to the sides of the filter. The fluid then flows transversely of the filter through the filtering stages 16 and 14 and then through the perforations in inner tube 10 to the interior of tube 10. In the configuration of FIG. 4, the central passageway of tube 10 is filled with a second type of active particles 40, such as an ion exchange resin for water softening. Particles 40 are retained in place by a metal screen 42 or other sized porous material of 50 mesh or smaller size. After the fluid passes transversely through filtering stages 16 and 14, it then flows generally axially through the interior of tube 10 and the fluid is then discharged through an orifice 44 to be delivered for use in its filtered state.

In order to insure the initial effectiveness of the active particles 40, it has been found necessary to increase the path length of flow through the particles 40. Otherwise during early stages of use of the filter much of the fluid will flow through the filter in the vicinity of retaining screen 42 since this is the path of least resistance. Thus, the final (nearest to screen 42) one-fourth to one-third of tube 10 is scaled so that the fluid is forced to enter tube 10 at a minimum distance above screen 42, thereby insuring that the fluid flows through a minimum depth of the active particles 42. This result can also be achieved by precoating the exterior of ring 16 with a low permeability powder such as diatomaceous earth and/or carbon, the coating being of differential thickness from a minimum adjacent end cap 24 to a maximum adjacent end cap 26. This differential coating promotes a differential transverse flow pattern through the filter inversely proportional to the coating thickness. However, as will be recognized by those skilled in the art, this coating alternative is a compromise because it somewhat reduces the total capability of the filter to hold suspended material.

While preferred embodiments have been shown and described, various modifications and substitutions may be made thereto without departing from the spirit and scope of the invention. Accordingly, it will be understood that the present invention has been described by way of illustration and not limitation.

What is claimed is:

1. A multiple phase filter cartridge including:
    a first fibrous filtering stage, said first filtering stage being of substantially constant thickness throughout the length thereof;
    at least a second fibrous filtering stage surrounding said first stage, said second filtering stage being of substantially constant thickness throughout the length thereof, said first and second fibrous filtering stages serving as successive filtering phases for fluid passing through said first and second filtering stages with said second stage being upstream of said first stage in the direction of fluid flow through the filter cartridge, said second filtering stage including fibrous material of fiber diameter greater than the fiber diameter of the fibrous material of said first filtering stage, said second filtering stage having greater permeability when compared to said first filtering stage and having a specific gravity sufficiently low to enable depth filtration therethrough, said fibrous material of said first filtering stage ranging in diameter from 0.1 to 25 microns and said fibrous material of said second filtering stage ranging in diameter from 5 to 100 microns;
    the fibers of each of said filtering stages being selected from the group consisting of up to 50% cellulose fibers, 20% to 90% polymer fibers and 10 to 30% glass fibers;
    discrete particles of pulverized chemically active material of 40 mesh or smaller in size, dispersed throughout one of said filtering stages; said particles being bonded to said fibers by a resin binder; the weight of said binder not exceeding 10 wt. % relative to the weight of said fibers of said one stage,
    each of said stages being of sufficient thickness such as to enable fluid flow in an essentially normal direction through the combined stages; and
    a discharge flow passage in said filter cartridge to receive and discharge fluid after passing through said filtering stages.

2. The multiple phase filter cartridge of claim 1 further comprising:
    an exterior casing having flow passages for the passage of fluid to be filtered to said second fibrous filtering stage.

3. The multiple phase filter cartridge of claim 1 further comprising:
a third fibrous filtering stage serving as an upstream filtering phase to said second filtering stage, said third fibrous filtering stage being of substantially constant thickness throughout the length thereof, said third filtering stage including fibrous material of fiber diameter larger than the fiber diameter of said second filtering stage, said third filtering stage having greater permeability than said second filtering stage.

4. A multiple phase filter cartridge as in claim 3 wherein said multiple phase filter cartridge includes:
discrete particles of charcoal dispersed throughout said second filtering stage.

5. A multiple phase filter cartridge as in claim 3 wherein:
the fibers of each of said filtering stages are selected from the group consisting of up to 50% cellulose fibers, 20 to 90% polymer fibers, and 10 to 30% glass fibers.

6. A multiple phase filter cartridge as in claim 5 including:
a resinous binder in each of said filter stages.

7. A multiple phase filter cartridge as in claim 6 wherein:
said resinous binder is not more than 10%, by weight, of said second filter stage.

8. The multiple phase filter cartridge of claim 1 wherein said particles of pulverized active material are in said second filtering stage and wherein said filter cartridge further comprises:
an interior perforated tube defining said discharge flow passage; and
said filtering stages being in coaxial annular arrays about said interior tube.

9. A multiple phase filter cartridge as in claim 8 wherein:
said active particles are charcoal.

10. A multiple phase filter cartridge as in claim 1 including:
a resinous binder in each of said filter stages.

11. A multiple phase filter cartridge as in claim 10 wherein:
said resinous binder is not more than 10%, by weight, of said second filter stage.

12. A multiple phase filter cartridge as in claim 11 including:
an interior perforated tube defining said central flow passage.

13. An inline filter including:
casing means having axially aligned fluid inlets and outlets; and
a multiple phase filter cartridge in said casing means, said filter cartridge including:
at least first and second fibrous filtering stages within said casing means, said first and second fibrous filtering stages serving as successive filtering phases for fluid passing therethrough;
said first filtering stage including an annular layer of substantially constant thickness of fibrous material of fiber diameter less than the fiber diameter of the fibrous material of said second filtering stage and being of lesser permeability than the second filtering stage;
said second filtering stage surrounding said first filtering stage and including an annular layer of substantially constant thickness of fibrous material of fiber diameter greater that the fiber diameter of the fibrous material of the first filtering stage and being of lower permeability than said first filtering stage and having a specific gravity sufficiently low to enable depth filtration therethrough, said second filtering stage being upstream in the direction of fluid flow from said first filter stage;
said fibrous material of said first filtering stage ranging in diameter from 0.1 to 25 microns and said fibrous material of said second filtering stage ranging in diameter from 5 to 100 microns;
the fibers of each of said filtering stages being selected from the group consisting of up to 50% cellulose fibers, 20 to 90% polymer fibers, and 10 to 30% glass fibers;
each of said filtering stages being of sufficient thickness such as to enable fluid flow in an essentially normal direction to the combined stages;
one of said filtering stages having discrete particles of pulverized chemically active material of 40 mesh smaller in size, disbursed throughout said one filtering stage; said particles being bonded to said fibers by a resin binder; the weight of said binder not exceeding 10 wt. % relative to the weight of said fibers of said one stage,
a central flow passage in said filter cartridge to receive and discharge fluid after passing through said filtering stage; and
means connecting said central flow passage to said outlet of said casing means.

14. A multiple phase filter cartridge as in claim 13 wherein:
said second filtering stage is the one stage having discrete particles of pulverized active material.

15. A multiple phase filter cartridge as in claim 14 including:
an interior perforated tube defining said central flow passage.

16. A multiple phase filter cartridge as in claim 13 wherein:
said active particles are charcoal.

17. A multiple phase filter cartridge as in claim 13 including:
a resinous binder in each of said filter stages.

18. A multiple phase filter cartridge as in claim 17 wherein:
said resinous binder is not more than 10%, by weight, of said second filter stage.

* * * * *